United States Patent [19]

Iqbal

[11] Patent Number: 4,874,006
[45] Date of Patent: Oct. 17, 1989

[54] DIVERTER VALVE AND VACUUM BREAKER USABLE THEREWITH

[75] Inventor: Muhammad Iqbal, Sheboygan, Wis.
[73] Assignee: Kohler Co., Kohler, Wis.
[21] Appl. No.: 301,484
[22] Filed: Jan. 26, 1989
[51] Int. Cl.⁴ .............................................. F16K 11/02
[52] U.S. Cl. ..................................... 137/119; 137/597; 137/625.17; 137/876
[58] Field of Search .................. 137/597, 625.17, 876, 137/119

[56] References Cited

U.S. PATENT DOCUMENTS

| | | | |
|---|---|---|---|
| 2,998,824 | 9/1961 | Ward | 137/119 |
| 3,232,308 | 2/1966 | Moen | 137/119 |
| 3,236,253 | 2/1966 | Symmons | 137/625.17 X |
| 3,414,018 | 12/1968 | Eversman | 137/597 |
| 3,460,568 | 8/1969 | Busquets | 137/597 |
| 3,471,872 | 10/1969 | Symmons | 137/119 X |
| 3,612,104 | 10/1971 | Busquets | 137/597 X |
| 3,779,278 | 12/1973 | Hill | 137/597 |
| 3,840,046 | 10/1974 | Busquets | 137/597 X |
| 4,589,438 | 5/1986 | Breda | 137/218 |
| 4,606,370 | 8/1986 | Geipel et al. | 137/119 |
| 4,753,265 | 6/1988 | Barrett et al. | 137/597 X |

FOREIGN PATENT DOCUMENTS

| | | | |
|---|---|---|---|
| 226025 | 7/1962 | Austria | 137/625.17 |
| 609376 | 9/1960 | Italy | 137/625.17 |

Primary Examiner—Stephen M. Hepperle
Attorney, Agent, or Firm—Quarles & Brady

[57] ABSTRACT

In an embodiment, a three way diverter valve assembly is provided which can divert water to a bathtub in one instance and to a shower or a hand held shower in two other instances. The valve assembly is easily assembled or disassembled while affording a positive shut off between the two shower outlets. A vacuum breaker feature is also provided which reduces "welding" to the valve body. In addition, a vacuum effect is reduced when operating between the shower outlet positions and the bath outlet. Also, the valve is constructed to reduce water hammer.

6 Claims, 3 Drawing Sheets

DIVERTER VALVE AND VACUUM BREAKER USABLE THEREWITH

BACKGROUND OF THE INVENTION

A. Field Of The Invention

This invention relates primarily to valves which direct fluids from one or more inlets to multiple outlets and to improved vacuum breakers. It appears best suited to be used with valves that divert water from a hot water inlet and a cold water inlet to a bathtub, a hand shower, and a wall shower.

B. Description Of The Art

With the increased popularity of "personal" hand held showers, it is desirable to have improved valves which can select the flow between the regular shower, the hand held shower and the tub. Some multi-outlet port diverter valve units are known. See e.g. U.S. Pat. Nos. 3,612,104 and 3,840,046. However, these patents present complex and multi-component valving systems.

Another problem associated with valves of this type is that a vacuum can be transferred to the diverter valve and then to the outlets when the vacuum arises in the hot or cold inlets. Solution of this problem is more complex than in single outlet valves because in valves of this type multiple outlets must be protected from the vacuum, preferably with a single structure. Further complicating matters is the tendency of some vacuum breakers to become stuck ("welded") against the valve body over time. Other problems with valves of this type are the lack of complete shutoff between the outlet shower positions, an undesired siphoning when the valve is moved from the shower and bath positions, the fact that water hammering can occur as the valve is shifted between the previously described positions, and difficulty in a first time user understanding their operation (e.g. in a hotel room context). Thus, it can be seen that a need exists for improved valves of this type and vacuum breakers therefor.

SUMMARY OF THE INVENTION

In one aspect, the invention provides a valve assembly for directing fluid flow from at least one inlet to at least three outlets. The valve assembly has a valve body with an axial bore having at least one fluid inlet, a first outlet spaced in one direction from the inlet and second and third outlets spaced from the first outlet. There is a valve seat in the valve body. A valve stem is positioned for axial and rotational movement in the valve body. The valve seat, valve stem, and valve body are configured and juxtaposed such that axial movement of the valve stem can change fluid flow from the first outlet to the second outlet, and such that rotation of the valve stem can change fluid flow from the second outlet to the third outlet.

Preferably, the valve is for use in conjunction with a plumbing fixture and two valve seats are provided in the valve body. There is also a sleeve for removable positioning in the valve body with the sleeve having an opening for communication with the first outlet. The stem is in the sleeve. There is also a spool connected to the stem having a sealing surface for selective positioning with respect to the second and third outlets when positioned in the valve body. A sealing member means is connected to the stem member for abutting against the valve seats. When the sealing member is positioned in contact with a first one of the valve seats, fluid is diverted to a first outlet and when the sealing member is positioned in contact with a second valve seat, fluid can be diverted to second and third outlets.

In another aspect, there is a vacuum breaker for a valve assembly wherein a valve body has a cylindrical bore that is in communication at one end with atmosphere and at the other end with a water supply. A diaphragm is positioned in the cylindrical bore so that a peripheral edge of the diaphragm is in resilient contact with the valve body, so as to provide a seal during normal conditions. The diaphragm has a central through hole. There is a support for the diaphragm extending through the through hole as well as biasing means to bias the diaphragm in the valve body in an axial manner towards the water supply end of the body. The diaphragm is resiliently slideably mounted on the support for axial movement with respect thereto.

Such valves can be easily assembled and disassembled. All of the inlet and outlet ports radially extend from the valve body to afford easy connection to exterior supply and outlet lines.

The valve reduces the tendency of vacuum breaker diaphragms to weld to the valve body over time by permitting limited floating action of the seal. Also, the valve is easy for a first time user to understand since shower functions are conceptually separated from the bath/shower choice.

If desired, the valve can also provide special grooves on the spool that seals between the second and third outlets to facilitate valve stem resistance caused by the vacuum created when the stem is moved; a spring can be provided so as to return the valve to the bath outlet position automatically when the water is turned off, and the stem can be provided with fluid cushioning members to prevent water hammer when the sealing member is moved between the two sealing positions.

The objects of the invention therefore include:

a. Providing a valve of the above kind which can easily and efficiently be manufactured, installed, and operated;

b. Providing a valve of the above kind which provides a very different type of movement when selecting between bath and shower than when selecting between shower outlets.

c. Providing a valve of the above kind which can be manufactured with a few parts and thus at reduced costs;

d. Providing a valve of the above kind which can be easily repaired;

e. Providing a valve of the above kind which affords an improved vacuum breaking function;

f. Providing a valve of the above kind which provides more positive shut off and positioning between two shower outlets;

g. Providing a valve of the above kind which reduces water hammer when the valve is changed between the tub and shower positions; and h. Providing a valve of the above kind which compensates for vacuum effect caused by valve stem movement during operation.

These and still other objects and advantages of the invention will be apparent from the description which follows. In the detailed description below, the preferred embodiments of the invention will be described in reference to the accompanying drawings. The embodiments do not represent the full scope of the invention. Rather the invention may be employed in other embodiments.

DESCRIPTION OF THE PREFERRED EMBODIMENTS

Figure 9:
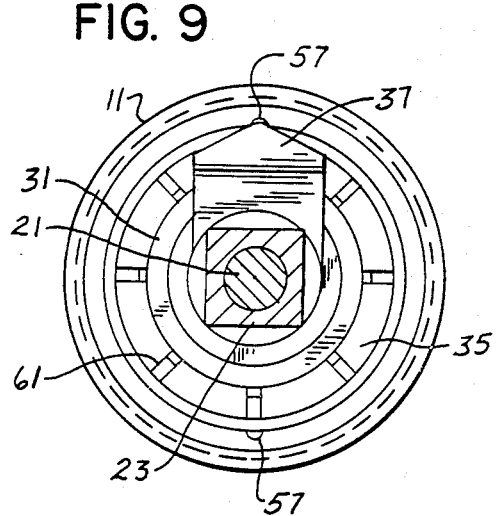
FIG. 9 is a sectional view taken along line 9—9 of FIG. 5.
Figure 1:
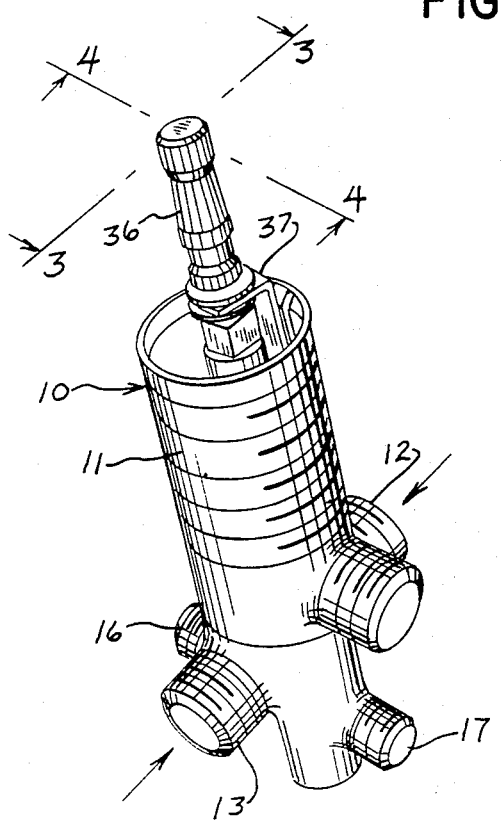
FIG. 1 is a top perspective view showing a valve assembly constituting a preferred embodiment of the invention.
Figure 2:
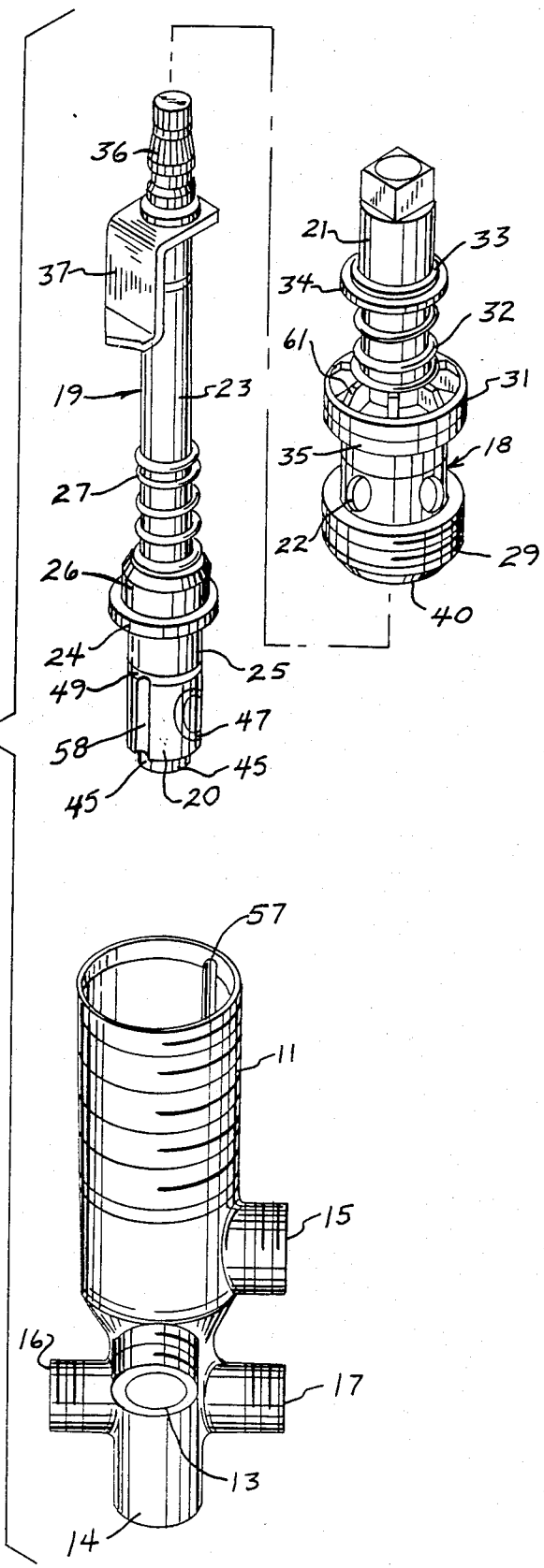
FIG. 2 is an exploded perspective view of the main parts of the valve assembly shown in FIG. 1.

Referring to FIGS. 1 and 2, the diverter assembly generally 10, has a valve body 11 into which is placed a sleeve and seat assembly generally 18, as well as a stem assembly generally 19. The valve body 11 includes two opposing hot and cold water inlet passages 12 and 13, a bath tub outlet 15, as well as two 180° opposed water outlet passages 16 and 17 for the usual shower and a hand held shower. The directional arrows in FIG. 1 show the intake of water through the hot and cold intake passages such as would be supplied and controlled by standard valves. It will be appreciated that for premixed water, only one inlet needs to be used, and the other inlet can be capped.

Figure 3:
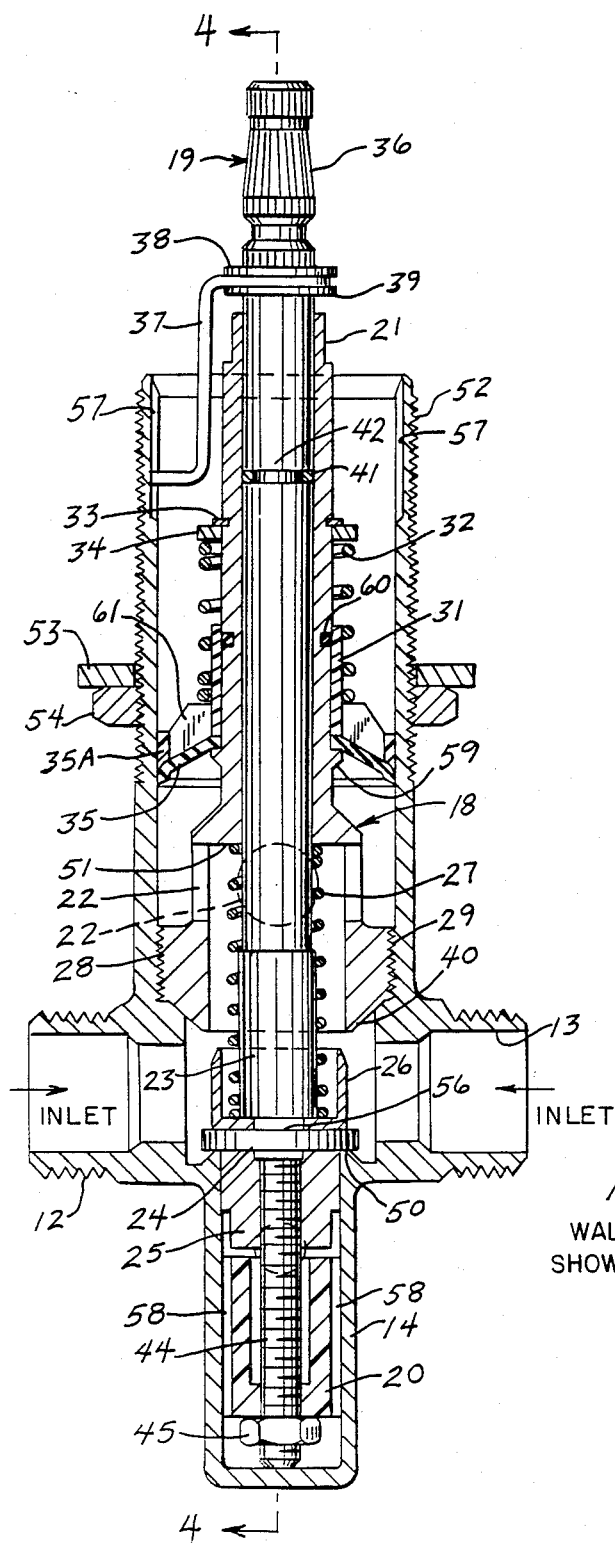
FIG. 3 is a sectional view of the valve assembly shown in FIG. 1 taken on plane 3—3 of FIG. 1.

As indicated specifically in FIG. 2, the stem assembly 19 is insertable in the bottom of hollow sleeve and seat assembly 18. This will be done before indicator 37 is secured thereto. With the stem assembly 19 inside the sleeve and seat assembly (and as best seen in FIG. 3), the threaded section 29 of the sleeve and seat assembly 18 can be threaded into the valve body 11 by threading it onto corresponding internal threads 28. This positions the spool 20 in the lower tubular portion 14 of the valve body 11. At the same time, the stem portion 23 of the stem assembly 19 is rotatably positioned inside the tubular portion 21 of the sleeve and seat assembly 18.

A sealing washer 24, is held on the stem portion 23 between the spring retainer 26 and the washer retainer 25. Referring again to FIGS. 3-5, the stem assembly 19, has a threaded portion 44, for threadable engagement with the washer retainer 25. This positions the sealing washer 24 against the spring retainer 26 which in turn is held against the stem portion 23 with both the spring retainer 26 and the washer 24 having openings to receive a reduced diameter portion 56 of the stem portion 23. As best seem in FIG. 4, threaded portion 44 has a flat section 43 which extends through the flat opening 46 in the spool 20 for securing the spool 20 in a spaced manner from the washer retainer 25. A jam nut 5 secures the attachment. The spacing between the spool 20 and the washer retainer 25 is indicated by the numeral 49. This is for the purpose of allowing suitable flow of water from the inlets 12 and 13 as will be indicated later.

A spring 27 is placed in the spring retainer 26 and extends between it and the shoulder 51 of the sleeve and seat assembly 18, while surrounding the stem portion 23. This spring biases the sealing washer 24 against the lower seat 50. This is the position indicated in the FIGS. 3 and 4. With water entering into the hot and cold inlets 12 and 13, water is free to move upwardly between the stem portion 23 and the threaded section 29, and then outwardly from the openings 22 to the bath outlet 15.

Figure 5:
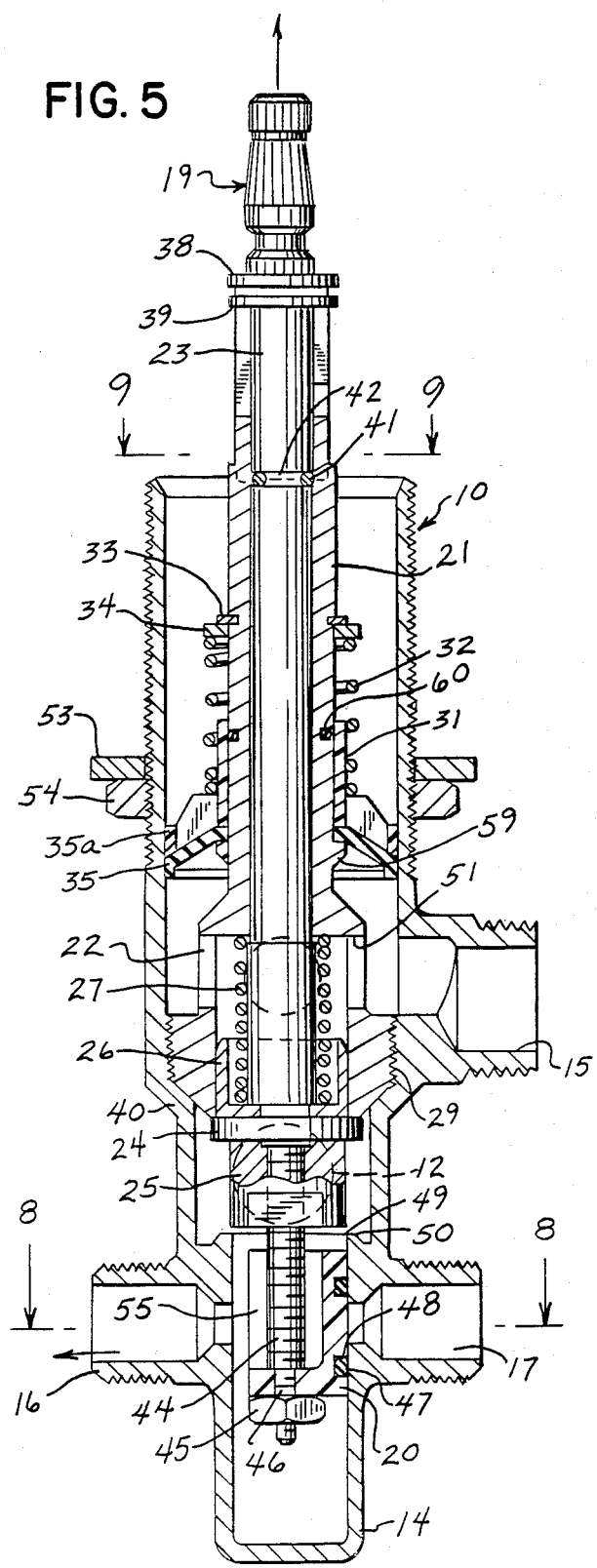
FIG. 5 is a view similar to FIG. 4, showing the valve in a diversion position.
Figure 8:
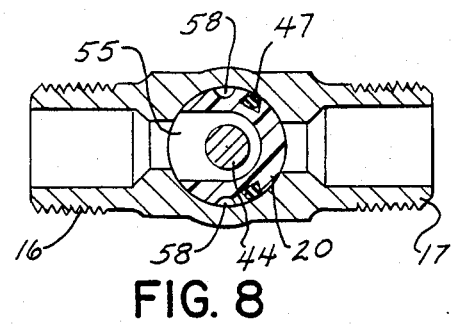
FIG. 8 is a sectional view taken along line 8—8 of FIG. 5.
Figure 7:
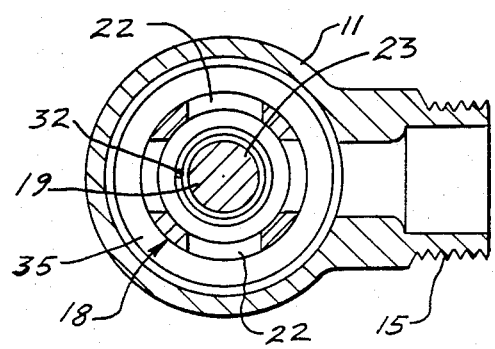
FIG. 7 is a sectional view taken along line 7—7 of FIG. 4.

When it is desired to divert hot and cold water to the stationary shower outlet 16, or to the hand held shower outlet 17, an upward force is imparted on the stem assembly 19. This raises the sealing washer 24 to the position shown in FIGS. 5 and 6. There it contacts the upper valve seat 40. In this position, water from the hot and cold inlets 12 and 13 flows into the spacing 49 between the spool 20 and the washer retainer 25. With the spool 20 positioned as shown in FIG. 5, water then flows downwardly in the valve body 11 to the spool opening 55 and into the wall shower outlet 16. A seal 47 is housed in the O-shaped cavity 48 of the spool 20. In the FIG. 5 position, it seals the water from entering the hand held shower outlet 17.

In order to divert water into the hand shower outlet 17, the stem assembly 19 is rotated 180° to place the seal 47 over the stationary shower outlet 16. This is the position shown in FIG. 6. Water then flows through the previously described spacing 49, through the spool opening 55, and into the hand held shower outlet 17. In this position, the indicator 37 (see FIGS. 2 and 3) is utilized in order to show a user the direction the spool 20 is directing the water. The indicator is rotated until it comes to rest in the groove 57, which is orientated with the hand held shower outlet 17. It will be appreciated that there are two grooves 57 in the valve body 11 for index orientation in conjunction with the shower outlets 16 and 17 and for detent indexing with the indicator 37. In its finished form, an escutcheon will cover the open end of the valve body 11 so the indicator 37 is not seen. The indicator is retained on the stem portion 23 by retainer clips 38 and 39 accommodated in stem grooves.

Figure 6:
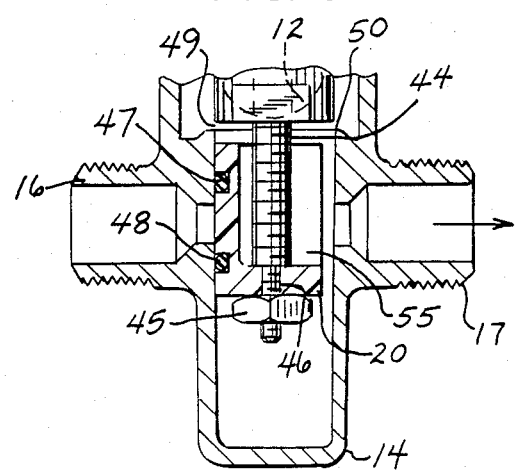
FIG. 6 is a partial view of the assembly shown in FIG. 5, with valve stem rotated 180° on its vertical axis.

It will be recognized that with the stem assembly placed in an upward position as indicated in FIG. 5 or 6 that the spring 27 is in a compressive state. The force of the spring continues to be overcome by the pressure of the water entering from the inlets 12 and 13 and acting on the under side of the washer 24. Spring 27 will automatically return the stem assembly 19 to the position shown in FIGS. 3 and 4 when the water pressure is greatly reduced (such as when no water is entering inlets 12 or 13). This automatically returns the diverter valve assembly to a position to direct water to the bathtub outlet 15.

An upper seal is required between the sleeve and seat assembly 18 and the inside of the valve body 11. At the same time, a vacuum could occur in the hot or cold inlets 12 and 13. Both a seal and a vacuum breaker effect is provided by the movable diaphragm 35 which has a skirt portion 35A for riding inside the valve body 11. The diaphragm 35 is biased against a shoulder 59 on the tubular body 21. This biasing is afforded by the spring 32 acting against the backing ring 31 for the diaphragm 35. Unlike prior diaphragm vacuum breakers, the center of the diaphragm is not fixed in place. Rather, it rides up and down tube 21 as valve pressure changes. This movement causes the diaphragm 35 periphery to move up and down along the body interior even during new-vacuum conditions. Thus, the diaphragm 35 resists welding itself to the brass body 11 over a period of time. A seal 60 is disposed in a suitable groove in the tubular body 21 and inside the backing ring 31 to prevent leakage during movement of the diaphragm 35 and the support 31.

In the event that a vacuum occurs in the hot or cold inlets 12 and 13, the diaphragm 35 is sucked away from the spider support 31 and the inside of the valve body 11 to vent the vacuum through the openings between the ribs 61 of the support 31 to the atmospheric pressure above it. Due to its elastic memory, the diaphragm 35 will return to its original position after the vacuum condition is obviated. Under normal circumstances when there is positive pressure on the water side of the diaphragm 35, it will create a seal (albeit a floating seal) against the valve body 11. Accordingly, the diaphragm 35 and the biased diaphragm support 31 act as a combined seal and a vacuum breaker. The spring 32 for the vacuum breaker is retained between the diaphragm support 31 and a washer 34 by means of the retaining clip 33 which is retained in a suitable groove in the tubular body 21.

Figure 4:
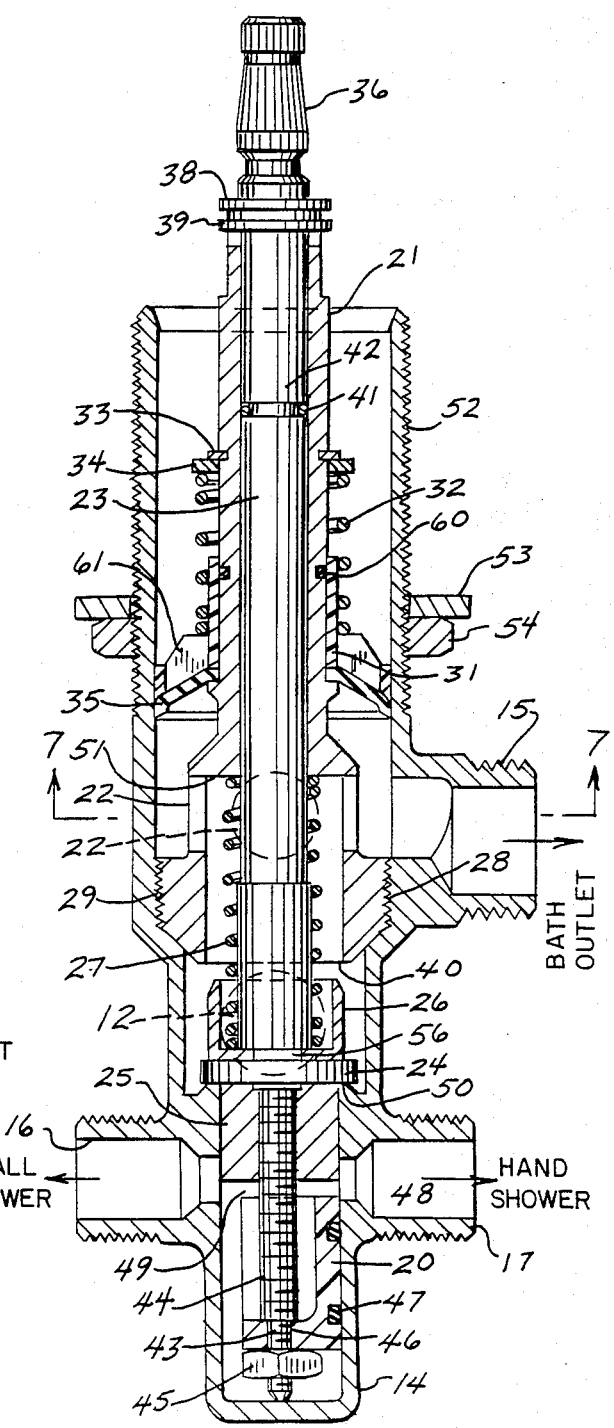
FIG. 4 is a view similar to FIG. 3, taken on plane 4—4 of FIG. 1 (also 4—4 of FIG. 3)

A problem which could arise in moving the diverter assembly from the bath outlet position (as shown in FIGS. 3 and 4) to the shower outlet positions (as shown in FIGS. 5 and 6) is that a partial vacuum could be created between the lower end of the spool 20 and the tubular portion 14 of the valve body 11. This is alleviated by the grooves such as 58, which are placed on opposing sides of the spool 20. This allows water to flow into the tubular portion 14, and behind the spool 20 to thereby obviate a resistance to valve stem movement or a sucking of water back from the shower outlets.

Another feature of the diverter assembly is its cushioning effect so as to obviate a water hammer when the sleeve and seat assembly 18 is moved upwardly, and the seal 24 is moved away from seat 50 and onto seat 40. This is afforded by the transverse dimension of the spring retainer 26 which acts as an upper cushion, and the transverse dimension of the washer retainer 25 which acts as a lower cushion. It will be appreciated that as the spring retainer 26 is moved upwardly and inside the threaded section 29, it will slowly reduce water flow therein. At the same time, the water pressure cannot effect a large force on the downward side of the washer 24 as it is surrounded by the washer retainer 25 which has a cross-section only slightly smaller than the cross-section of the washer 24. The cushioning effect will also be applicable when the stem portion 23 is moved downwardly. The spring retainer 26 has a cross-section only slightly smaller than that of the washer 24 and thus prevents a large force from acting on the upward side of the washer 24 as it moves downwardly in contact with the seat 50.

In addition to the previously mentioned seals, there is also provided a seal between the tubular body 21 and the stem portion 23 such as by the seal 41 retained in the groove 42 in the stem portion 23.

The diverter assembly 10 can be suitably mounted to a support such as a tub wall by the nut 54 and the washer 53 engaged on the outer threads 52 of the valve body 11.

Thus, the invention provides an improved valve. While the preferred embodiment is described above, it should be readily apparent to those skilled in the art that a number of modifications and changes may be made without departing from the spirit and scope of the invention. For example, the invention is not limited to just plumbing applications. It can be employed in conjunction with any fluid control valve or valves where it is desired to divert fluid to three separate outlets. It can also be employed with a single inlet passage or a multiplicity of controlled inlets. In the latter instance, it will afford suitable mixing. Any type of fluid whether liquid or gas can be used. Also, the specific materials (steel, brass, rubber) are not the only materials which can be used. Such modifications and other modifications within the spirit of the invention are meant to be within the scope of the claims.

I claim:

1. A valve assembly for directing fluid flow from at least one inlet to at least three outlets, comprising:

a valve body having an axial bore with at least one radially disposed fluid inlet, a first radially disposed outlet spaced in one direction from said inlet, and second and third radially disposed outlets axially spaced from the first outlet;

valve seat means in the valve body;

a valve stem having a plurality of sealing means attached thereto, the stem being positioned for axial and rotational movement in the valve body and for selective abutting contact of a first sealing means with the valve seat means and a second sealing means with the second and third outlets;

the valve seat means, valve stem, and valve body being configured and juxtaposed such that axial movement of the valve stem can change fluid flow from the first outlet to the second outlet and such that rotation of the valve stem can change fluid flow from the second outlet to the third outlet.

2. A valve for use in conjunction with a plumbing fixture comprising:

a valve body having an axial bore with at least one fluid inlet, a first outlet spaced in one direction from the inlet, and second and third outlets spaced from the first outlet, two spaced apart valve seats in axial alignment in the valve body;

a sleeve for removable positioning in the valve body, the sleeve having an opening for communication with the first outlet;

a stem member positioned for axial and rotational movement in the sleeve;

a spool connected to the stem member having a sealing surface for selective positioning with respect to the second and third outlets when positioned in the valve body;

a sealing member means connected to the stem member for alternative abutting against the valve seats;

whereby when the sealing member is positioned in contact with a first one of the valve seats, fluid is diverted to the first outlet, and when the sealing member is axially moved so as to be positioned in contact with a second valve seat, fluid can be diverted between the second and third outlets by rotation.

3. The valve of claim 2 including biasing means to bias the sealing member means against one of the valve seats.

4. The valve of claim 2 further including at least one longitudinal groove disposed in the spool and constructed and arranged to facilitate axial movement of the stem.

5. A valve for use in conjunction with a plumbing fixture comprising:

a valve body having an axial bore with at least one fluid inlet, a first outlet spaced in one direction from the inlet, and second and third outlets spaced from the first outlet;

two valve seats in the valve body;

a sleeve for removable positioning in the valve body, the sleeve having an opening for communication with the first outlet;

a stem member positioned for axial and rotational movement in the sleeve;

a spool connected to the stem member having a sealing surface for selective positioning with respect to the second and third outlets when positioned in the valve body;

a first sealing member means connected to the stem member for abutting against the valve seats; and a second sealing member means disposed between the sleeve and the inside of the valve body which also provides a vacuum breaker means;

whereby when the sealing member is positioned in contact with a first one of the valve seats, fluid is diverted to the first outlet, and when the sealing member is axially moved so as to be positioned in contact with a second valve seat, fluid can be diverted to the second and third outlets.

6. The valve of claim 5 wherein the vacuum breaker means includes a diaphragm member biased against the valve body.

* * * * *